United States Patent
Kuwahara et al.

(10) Patent No.: US 7,908,065 B2
(45) Date of Patent: Mar. 15, 2011

(54) CONTROL APPARATUS AND CONTROL METHOD OF A VEHICLE, PROGRAM FOR REALIZING THAT CONTROL METHOD USING A COMPUTER, AND RECORDING MEDIUM ON WHICH THAT PROGRAM IS RECORDED

(75) Inventors: Seiji Kuwahara, Toyota (JP); Toshihiro Fukumasu, Toyota (JP); Masami Kondo, Toyota (JP); Hideki Kubonoya, Toyota (JP); Naoto Moriya, Toyota (JP); Masato Kaigawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 415 days.

(21) Appl. No.: 11/874,463

(22) Filed: Oct. 18, 2007

(65) Prior Publication Data
US 2008/0097674 A1    Apr. 24, 2008

(30) Foreign Application Priority Data
Oct. 20, 2006 (JP) ................................. 2006-286201

(51) Int. Cl.
*F16H 61/00* (2006.01)
(52) U.S. Cl. ............. 701/51; 701/55; 477/115; 477/117; 477/120; 477/46
(58) Field of Classification Search .................... 701/51, 701/55; 477/115, 117, 120, 46
See application file for complete search history.

(56) References Cited

U.S. PATENT DOCUMENTS

| 5,388,856 | A | * | 2/1995 | Yonezawa .................. 280/5.519 |
| 5,467,277 | A | * | 11/1995 | Fujisawa et al. ................. 701/51 |
| 5,519,610 | A | * | 5/1996 | Tsutsui et al. ................... 701/51 |
| 5,857,162 | A | * | 1/1999 | Vukovich et al. ............... 701/62 |
| 5,913,916 | A | * | 6/1999 | Bai et al. .......................... 701/59 |
| 5,941,793 | A | * | 8/1999 | Ito et al. ......................... 477/120 |
| 6,019,701 | A | * | 2/2000 | Mori et al. ....................... 477/46 |
| 6,085,139 | A | * | 7/2000 | Nakauchi et al. ............... 701/52 |
| 6,128,566 | A | * | 10/2000 | Nishino .......................... 701/52 |
| 6,157,886 | A | * | 12/2000 | Janecke ........................... 701/55 |
| 6,285,941 | B1 | * | 9/2001 | Janecke ........................... 701/55 |
| 6,374,170 | B1 | * | 4/2002 | Kresse et al. ................... 701/51 |
| 6,415,214 | B2 | * | 7/2002 | Nishimura et al. ............. 701/51 |

(Continued)

FOREIGN PATENT DOCUMENTS

DE      198 49 059 A1     4/2000

(Continued)

*Primary Examiner* — Thomas G Black
*Assistant Examiner* — Wae Louie
(74) *Attorney, Agent, or Firm* — Sughrue Mion, PLLC

(57) ABSTRACT

An ECU executes a program that includes the steps of i) calculating a sporty running counting SC based on a state of a vehicle according to an operation of a driver; ii) changing a condition for executing sporty running in which an upshift is inhibited when an accelerator is suddenly released and in which a downshift is promoted during sudden braking such that the condition is easier to satisfy and changing a condition for returning from sporty running so that it is more difficult to satisfy when the sporty running count SC is equal to or greater than a threshold value; and iii) changing the condition for executing sporty running so that it is more difficult to satisfy and changing the condition for returning from sporty running so that it is easier to satisfy when the sporty running count SC is not equal to or greater than the threshold value.

15 Claims, 6 Drawing Sheets

U.S. PATENT DOCUMENTS

| | | | |
|---|---|---|---|
| 6,421,596 B2 * | 7/2002 | Lee | 701/51 |
| 6,449,548 B1 * | 9/2002 | Jain et al. | 701/56 |
| 6,450,919 B2 * | 9/2002 | Kusafuka et al. | 477/115 |
| 6,456,918 B2 * | 9/2002 | Nanri | 701/51 |
| 6,466,851 B2 * | 10/2002 | Kato et al. | 701/51 |
| 6,526,343 B2 * | 2/2003 | Saito et al. | 701/51 |
| 6,908,413 B2 * | 6/2005 | Ayabe et al. | 477/109 |
| 7,160,227 B2 * | 1/2007 | Kuwahara et al. | 477/116 |
| 7,274,983 B1 * | 9/2007 | Kim | 701/55 |
| 7,585,242 B2 * | 9/2009 | Endo | 475/117 |
| 7,653,469 B2 * | 1/2010 | Bai et al. | 701/55 |
| 2008/0097674 A1 * | 4/2008 | Kuwahara et al. | 701/51 |

FOREIGN PATENT DOCUMENTS

| | | |
|---|---|---|
| DE | 100 22 610 A1 | 11/2001 |
| JP | 07-077273 A | 3/1995 |
| JP | 7-119804 A | 5/1995 |
| JP | 07-167273 A | 7/1995 |
| JP | 2001-132833 A | 5/2001 |
| JP | 2006-046383 A | 2/2006 |
| JP | 2006-97862 A | 4/2006 |

* cited by examiner

G VALUE AND G VALUE CHANGE AMOUNT (RATE)

ACCELERATOR PEDAL DEPRESSION AMOUNT AND AMOUNT (RATE) OF CHANGE IN THAT DEPRESSION AMOUNT

BRAKE PEDAL DEPRESSION FORCE AND AMOUNT (RATE) OF CHANGE IN THAT DEPRESSION FORCE

CONTROL APPARATUS AND CONTROL METHOD OF A VEHICLE, PROGRAM FOR REALIZING THAT CONTROL METHOD USING A COMPUTER, AND RECORDING MEDIUM ON WHICH THAT PROGRAM IS RECORDED

INCORPORATION BY REFERENCE

The disclosure of Japanese Patent Application No. 2006-286201 filed on Oct. 20, 2006, including the specification, drawings and abstract is incorporated herein by reference in its entirety.

BACKGROUND OF THE INVENTION

1. Field of the Invention

The invention relates to control of a vehicle provided with a powertrain having a driving source and a transmission. More particularly, the invention relates to control of a vehicle, which can realize vehicle behavior which matches that required by a driver.

2. Description of the Related Art

An automatic transmission connected to an engine in a vehicle typically automatically controls the vehicle by determining the speed ratio according to the accelerator operation amount of the driver and the vehicle speed. During normal running, the speed ratio is set on the higher speed side on a shift map as the accelerator operation amount decreases or the vehicle speed increases.

The driving mode (e.g., comfort, economy, sport, etc.) selected by the driver can be identified based on the driving operation of the driver, and that mode can also reflected in the shift control. For example, the shift map is changed according to the driving mode such that the automatic transmission is controlled so that it does not easily upshift but easily downshifts or so that it easily downshifts but does not easily upshift. There are also vehicles that have a running mode selector switch (i.e., a switch that enables the driving mode to be manually switched between comfort mode, sport mode, economy mode, etc.) to detect this kind of driving so that the driver can manually select the driving mode.

Japanese Patent Application Publication No. 2001-132833 (JP-A-2001-132833) describes a shift control apparatus that is provided with a plurality of driving modes such as a sport mode which maintains a high engine speed and engages the engine brake, in addition to a normal running mode used for normal running. This shift control apparatus aims to minimize the number of time constants used in shift control while obtaining the same driving feel irrespective of the driving mode when the same driving operation is performed. This shift control apparatus includes a post-shift speed ratio calculating portion that calculates the speed ratio that will be realized after a shift in a continuously variable transmission according to the driving state of the vehicle, a first shift mode according to normal running, and a second shift mode that increases the engine braking force by restricting, according to the vehicle speed, a lower limit value of the post-shift speed ratio when the accelerator pedal has been released, i.e., is not being depressed. Further, this shift control apparatus is a shift control apparatus of a continuously variable transmission that is provided with a shift mode selecting portion that selects the shift mode from among these shift modes, a time constant calculating portion that calculates a time constant according to the driving state of the vehicle, a calculating portion that calculates a target speed ratio based on this time constant, and a shift control portion that controls the speed ratio such that the actual speed ratio matches this target speed ratio. The time constant calculating portion calculates the time constant according to the difference between the post-shift speed ratio and the target speed ratio or the actual speed ratio, and also has a time constant correcting portion that corrects the time constant so that the shift speed becomes faster when the shift mode selecting portion has selected the second shift mode.

According to this shift control apparatus of a continuously variable transmission, in addition to the first shift mode for normal running, a second shift mode is also provided which restricts the lower limit value of the post-shift speed ratio according to the vehicle speed and thus increases the engine braking force. The first or second shift mode can be selected, and the target speed ratio when the shift is performed is calculated according to the time constant that was set beforehand. This time constant is calculated based on the difference between the post-shift speed ratio and the target speed ratio or the actual speed ratio. However, in the second shift mode, the time constant can be obtained by correcting the time constant of the first shift mode so that the shift speed becomes faster. This obviates the need to provide a time constant map and the like for each driving mode, thereby reducing manufacturing costs. Also, the lower limit value of the post-shift speed ratio is restricted so the shift speed can be made faster according to a driving operation, e.g., the depression amount of the accelerator pedal, in the second shift mode as well which has a smaller shift width than the first shift mode. Accordingly, the same shift speed can be applied to the same driving operation irrespective of the driving mode so an unpleasant driving sensation is not imparted to the driver.

However, according to JP-A-2001-132833, a first running mode which is a normal running mode used for normal running, and a second running mode which is a sport mode that maintains a high input shaft rotation speed NT and utilizes the engine brake are provided. A speed ratio according to the driving state is then controlled based on the driving mode detected by the selector switch that is operated by the driver. Typically, in the second running mode which utilizes the engine brake, the engine speed increases thus increasing the noise and adversely affecting quietness. The driver therefore must choose between the responsiveness of the sporty running and the quietness of the normal running, select the driving mode him or herself, and operate the selector switch accordingly Therefore, the driver must constantly switch between driving modes in order to achieve both the responsiveness of sporty running and the quietness of the normal running.

SUMMARY OF THE INVENTION

This invention thus provides a control apparatus and control method of a vehicle which is able to realize the behavior of a vehicle required by a driver without requiring that the driver select a mode, a program for realizing that control method using a computer, and a recording medium on which that program is recorded.

A first aspect of the invention relates to a control apparatus of a vehicle, which includes a detecting portion that detects a state of the vehicle according to an operation by a driver; a calculating portion that calculates, based on the detected state of the vehicle, a degree of quickness with which the driver requires the vehicle behave; and a control portion that switches a running mode from a normal mode to a sport mode and changes a condition determined for an engine and an automatic transmission mounted in the vehicle when the degree is equal to or greater than a predetermined degree, and controls the engine and the automatic transmission in the sport mode. A control method of a vehicle according to a ninth aspect of the invention has a structure that is similar to the control apparatus for a vehicle according to the first aspect.

In the control apparatus and control method for a vehicle according to the foregoing aspects, the state of the vehicle, e.g., the acceleration of the vehicle, the accelerator depression amount, and the brake depression force and the like, according to an operation by the driver are detected. The values indicative of the vehicle state and the change amounts and change rates of those values are obtained and the degree of quickness with which the driver requires the vehicle behave (i.e., the degree to which sporty running is required) is calculated. If it is determined that this degree is large, the shift condition determined for the engine and the automatic transmission is changed so that it is more easily satisfied to enable sporty running to be executed, and the engine and automatic transmission are controlled in the sport mode. Therefore, the behavior (quickness) of the vehicle that is desired by the driver can be realized by changing to the sport mode without the driver having to operate a selector switch to which the operating mode. That is, the operating mode desired by the driver is constantly being determined from the operating state of the vehicle so it is possible to switch back and forth between the quickness of the sport mode and the characteristics (e.g., quietness) of the normal mode and therefore realize both without the driver having to consciously perform an operation. As a result, a control apparatus and control method of a vehicle are able to be provided which can realize behavior desired by the driver without the driver having to perform an operation to select the mode.

In a control apparatus of a vehicle according to a second aspect of the invention, in addition to the structure of the first aspect, the automatic transmission may be one of a stepped automatic transmission and a stepless automatic transmission that is capable of simulating a stepped automatic shift by discretely setting a plurality of speed ratios, and a determination as to whether to execute a shift may be made based on a shift map defined by a vehicle speed and an accelerator depression amount when the engine is operating in a region equal to or less than an upper limit speed set for the engine. The control portion may also include a portion that controls the engine and the automatic transmission in the sport mode by changing a shift line such that a condition for executing an upshift is made more difficult to satisfy even when an accelerator is suddenly released. A control method of a vehicle according to a tenth aspect has a structure that is similar to that of the control apparatus of a vehicle according to the second aspect.

In the control apparatus and control method for a vehicle according to the foregoing aspects, when running in the normal mode and the accelerator is suddenly released, the upshift line is crossed such that the automatic transmission upshifts and the engine speed decreases. As a result, the operating noise of the engine is reduced which improves quietness. When running in the sport mode, the shift line is changed so that the condition for executing an upshift is more difficult to satisfy. As a result, an upshift is not performed so not only can the engine speed be maintained without dropping much, but there is also no need to downshift when accelerating again thereafter so the vehicle can accelerate again quickly.

In a control apparatus of a vehicle according to a third aspect of the invention, in addition to the structure of the first aspect, the automatic transmission may be one of a stepped automatic transmission and a stepless automatic transmission that is capable of simulating a stepped automatic shift by discretely setting a plurality of speed ratios, and a determination as to whether to execute a shift may be made based on a shift map defined by a vehicle speed and an accelerator depression amount when the engine is operating in a region equal to or less than an upper limit speed set for the engine. The control portion includes a portion that controls the engine and the automatic transmission in the sport mode by changing a shift line such that a condition for executing a downshift is made easier to satisfy even when a brake is suddenly operated. A control method of a vehicle according to an eleventh aspect has a structure that is similar to that of the control apparatus of a vehicle according to the third aspect.

In the control apparatus and control method for a vehicle according to the foregoing aspects, when running in the normal mode and the brake is suddenly operated, the downshift line is not crossed so the engine speed does not increase, and thus neither does the operating noise of the engine so quietness is maintained. When running in the sport mode, the shift line is changed so that the condition for executing a downshift is made easier to satisfy and a downshift is performed. Therefore, the engine brake is applied so quick deceleration can be realized.

In a control apparatus of a vehicle according to a fourth aspect of the invention, in addition to the structure of the second or third aspect, the control portion may include a portion that controls the engine and the automatic transmission in the sport mode by changing the shift line and the upper limit speed. A control method of a vehicle according to a twelfth aspect has a structure that is similar to that of the control apparatus of a vehicle according to the fourth aspect.

In the control apparatus and control method for a vehicle according to the foregoing aspects, an upshift can be inhibited when the accelerator is suddenly released and a downshift can be promoted during sudden braking by shifting the shift line on a shift map defined by the vehicle speed and the accelerator depression amount (i.e., the throttle opening amount). Also, increasing the upper limit speed of the engine also makes it possible to i) inhibit an upshift when the accelerator is suddenly released (i.e., if an upshift is not performed the engine speed will become equal to or greater than the upper limit speed so that an upshift would be performed, but the upper limit speed is increased so the current speed can be maintained), and ii) make it easier to downshift during sudden braking (i.e., if a downshift is performed the engine speed will become equal to or greater than the upper limit speed, but the upper limit speed is increased so the downshift can be performed).

In a control apparatus of a vehicle according to a fifth aspect of the invention, in addition to the structure of any one of the first to the fourth aspects, the calculating portion may include a portion that calculates the degree of quickness based on at least one of the accelerator depression amount and a degree to which a brake is depressed according to the operation by the driver. A control method of a vehicle according to a thirteenth aspect has a structure that is similar to that of the control apparatus of a vehicle according to the fifth aspect.

With the control apparatus and control method for a vehicle according to the foregoing aspects, the degree of quickness with which the driver requires the vehicle behave is calculated to become larger when the driver greatly or quickly changes the accelerator depression amount or the brake depression force. In this way, the degree of quickness required by the driver can be calculated without the driver having to operate a selector switch.

In a control apparatus of a vehicle according to a sixth aspect of the invention, in addition to the structure of any one of the first to the fourth aspects, the calculating portion may include a portion that calculates the degree of quickness based on acceleration acting on the vehicle as a result of the operation by the driver. A control method of a vehicle according to a fourteenth aspect has a structure that is similar to that of the control apparatus of a vehicle according to the sixth aspect.

With the control apparatus and control method for a vehicle according to the foregoing aspects, the operation by the driver causes the vehicle to greatly accelerate (when the acceleration is in the longitudinal direction of the vehicle, a positive indicates acceleration and a negative indicates deceleration, and when the acceleration is in the lateral direction of the vehicle, the acceleration indicates the degree of sharpness of the turn). When there is a large change in the acceleration, the degree of quickness with which the driver requires the vehicle behave is calculated to be larger. In this way, the degree of quickness required by the driver can be calculated without the driver having to operate a selector switch.

A control apparatus of a vehicle according to a seventh aspect of the invention may also be further provided with, in addition to the structure of any one of the first to the sixth aspects, a portion that changes a condition for returning from the sport mode to the normal mode based on the degree of quickness. A control method of a vehicle according to a fifteenth aspect has a structure that is similar to that of the control apparatus of a vehicle according to the seventh aspect.

With the control apparatus and control method for a vehicle according to the foregoing aspects, the condition to return to the normal mode can be changed according to the requirement of the driver. That is, when the degree of quickness with which the driver requires the vehicle behave lessens, it is determined that quietness is required so the running mode is returned from the sport mode to the normal mode.

A control apparatus of a vehicle according to an eighth aspect of the invention may also be further provided with, in addition to the structure of any one of the first to the seventh aspects, a portion that switches the running mode from the sport mode to the normal mode when the degree of quickness is equal to or less than a predetermined degree. A control method of a vehicle according to a sixteenth aspect has a structure that is similar to that of the control apparatus of a vehicle according to the eighth aspect.

With the control apparatus and control method for a vehicle according to the foregoing aspects, when the degree of quickness with which the driver requires the vehicle behave lessens, it is determined that quietness is required so the running mode can be returned from the sport mode to the normal mode.

A seventeenth aspect of the invention relates to a recording medium on which is recorded a program that commands a computer to realize the control method according to any one of the ninth to the sixteenth aspects.

According to the seventeenth aspect, the control method of a vehicle according to any one of the ninth to the sixteenth aspects can be realized using a computer (either a general computer or a special computer).

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

Figure 1:
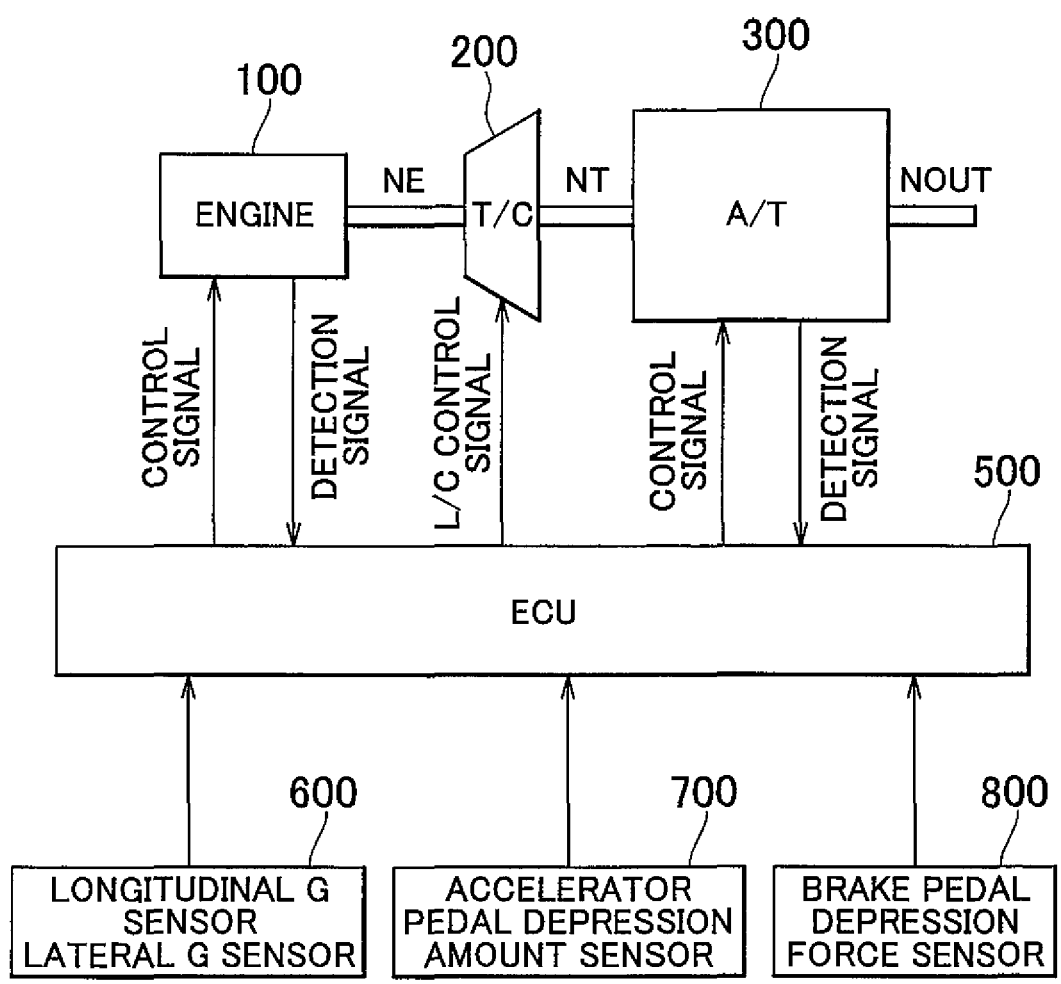
FIG. 1 is a control block diagram that includes an ECU which serves as a driving force control apparatus of a vehicle according to an example embodiment of the invention.

Hereinafter, example embodiments of the invention will be described in detail with reference to the accompanying drawings. In the following description, like parts will be denoted by like reference numerals. Like parts will also be referred to by the same nomenclature and will have the same function. Therefore, detailed descriptions of those parts will not be repeated.

FIG. 1 is a block diagram showing a powertrain of a vehicle which includes an ECU that serves as a control apparatus according to an example embodiment of the invention.

As shown in FIG. 1, this vehicle includes an engine 100; a torque converter (T/C) 200; an automatic transmission 300; an electronic control unit (ECU) 500 that controls the engine 100, the T/C 200, and the automatic transmission 300; a G sensor 600 that outputs a signal indicative of acceleration (a G value) acting on the vehicle (i.e., a signal indicative of a G value in the longitudinal direction and a G value in the lateral direction) to the ECU 500; an accelerator pedal depression amount sensor 700 that outputs a signal indicative of a depression amount of an accelerator pedal to the ECU 500, and a brake pedal depression force sensor 800 that outputs a signal indicative of the force with which a brake pedal is depressed (i.e., a depression force of the brake pedal) to the ECU 500. The accelerator pedal depression amount sensor 700 may also be a sensor that detects the force with which the accelerator pedal is depressed (i.e., a depression force of the accelerator pedal). Also, the brake pedal depression force sensor 800 may also be a sensor that detects the depression amount of the brake pedal.

Incidentally, in the following description, control of a vehicle provided with a powertrain having the engine 100, the torque converter 200, and the automatic transmission 300 as shown in FIG. 1 is described. However, the invention is not limited to this. For example, the vehicle may also be provided with a motor that is used to assist the engine 100. Incidentally, in this case, the motor may be a motor-generator which also functions as a generator that is driven by the driving wheels and the engine 100.

The ECU 500 outputs command signals such as a throttle opening amount command signal to the engine 100 and receives detection signals such as an engine speed (NE) signal from the engine 100.

Also, the ECU 500 outputs a L/C control signal that instructs a lockup clutch of the torque converter 200 to engage or release (including slip). Also, the ECU 500 outputs a control signal that is an oil pressure command signal to the automatic transmission 300 and receives detection signals such as an output shaft rotation speed (NOUT) from the automatic transmission 300. The ECU 500 can detect the vehicle speed based on this output shaft rotation speed signal.

Many automatic transmissions include a fluid coupling and a geared type stepped shift mechanism or a belt or traction type stepless shift mechanism. The shift mechanism shown in FIG. 1 is a geared type automatic transmission 300. Also, the torque converter 200 serves as the fluid coupling. This torque converter 200 includes a lockup clutch that mechanically links a member on the driving side of the torque converter 200 (i.e., a pump impeller on the engine 100 side) directly with a member on the driven side (i.e., a turbine runner on the automatic transmission 300 side). As a result, both improved fuel efficiency and riding comfort can be achieved. The lockup region in which this kind of lockup clutch is engaged is normally set based on the vehicle speed and the throttle opening amount, for example. The ECU 500 receives a turbine speed NT) signal which is indicative of the turbine speed which is the input shaft rotation speed of the automatic transmission 300 and the output shaft rotation speed of the lockup clutch.

The G sensor 600 detects acceleration (the G value) acting on the vehicle. This acceleration includes both a longitudinal G value for acceleration that acts in the longitudinal direction of the vehicle and a lateral G value for acceleration that acts in the lateral direction of the vehicle. The accelerator pedal depression amount sensor 700 detects the amount an accelerator pedal is depressed by the driver. However, a throttle valve opening amount sensor may also be used instead of this accelerator pedal depression amount sensor 700. The brake pedal depression force sensor 800 detects the force with which the brake pedal is depressed by the driver.

The ECU 500 automatically calculates the degree to which the driver wants to drive in a sporty manner (hereinafter this degree may also be referred to as the "sporty running count"). The ECU 500 determines that the driver wishes to drive in a sporty manner when this sporty running count is higher than a threshold value. When it is determined in this way that the driver wishes to drive in a sporty manner, the ECU 500 performs control that makes the automatic transmission 300 hold the speed when the accelerator is suddenly released (i.e., performs upshift inhibiting control or upshift preventing control), and performs control that makes the automatic transmission 300 tend to downshift during sudden braking (downshift promoting control).

Figure 2:
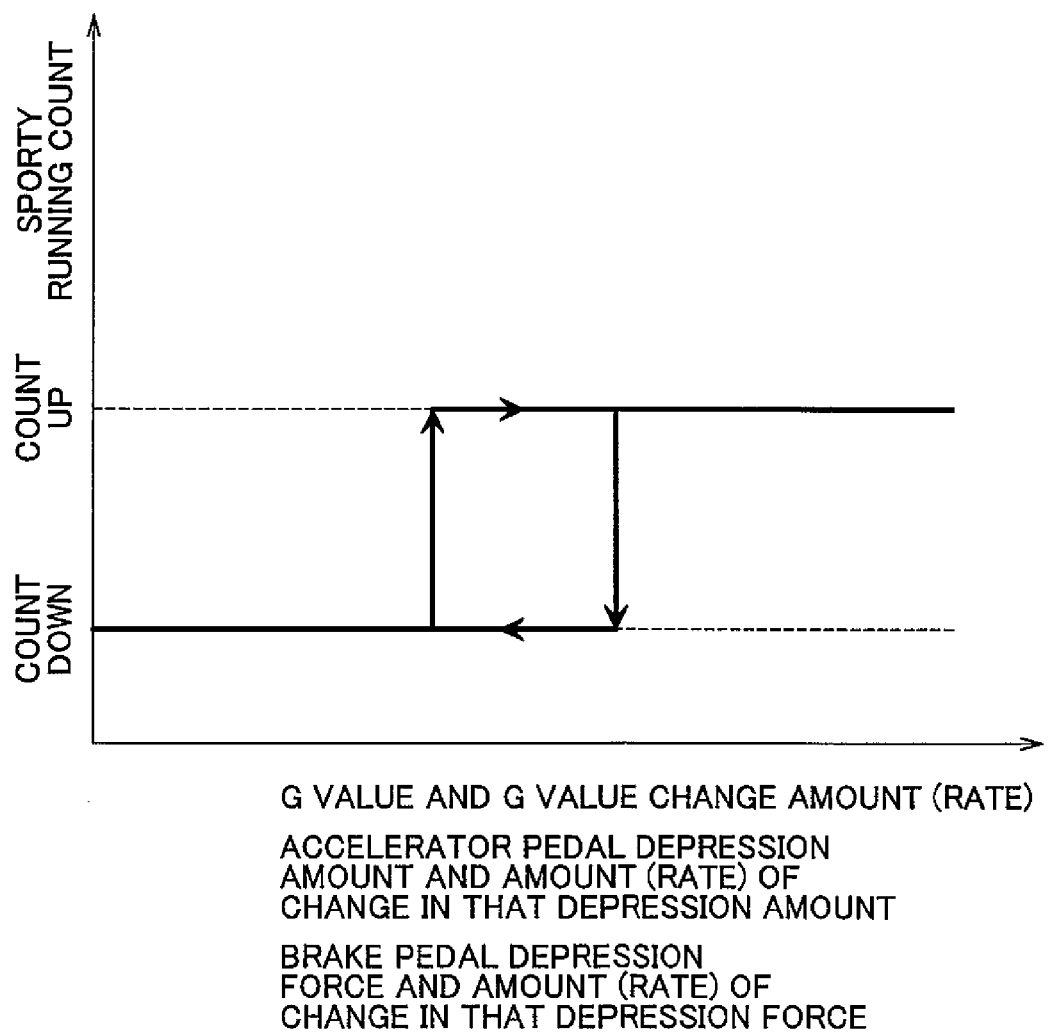
FIG. 2 is a graph showing the countup and countdown states of a sporty running count.

The countup and countdown of the sporty running count will now be described with reference to FIG. 2. The countup and countdown are performed based on the G value acting on the vehicle and/or the amount of change (or the rate of change (time)) in the G value, the accelerator depression amount and/or the amount of change (or the rate of change (time)) in the accelerator depression amount, and the brake pedal depression force and/or the amount of change (or the rate of change (time)) in the brake pedal depression force. Moreover, in order to prevent chattering, hysteresis is provided with the countup determination and the countdown determination.

The functional block diagram of the control apparatus according to this example embodiment will now be described with reference to FIG. 3. This control apparatus includes a vehicle state detecting portion 1000 that detects the vehicle state, e.g., the longitudinal G value and the lateral G value acting on the vehicle, the accelerator pedal depression amount, and the brake pedal depression force, a control portion 2000, and a drive control portion 3000 that actually controls the engine 100 and the automatic transmission 300.

The control portion 2000 includes a sporty running count calculating portion 2100 that calculates the degree to which the driver is demanding sporty running (i.e., the sporty running count) based on the state of the vehicle, a sporty running determining portion 2200 that changes the condition for executing sporty running and the condition for returning from sporty running based on the calculated sporty running count, and a sporty running indicating portion 2300 which outputs to the drive control portion 3000 instructions to perform control to make the automatic transmission 300 hold the speed when the accelerator is suddenly released (i.e., performs upshift inhibiting control or upshift preventing control), and control to make the automatic transmission 300 tend to downshift during sudden braking (i.e., downshift promoting control) for sporty running.

Figure 3:
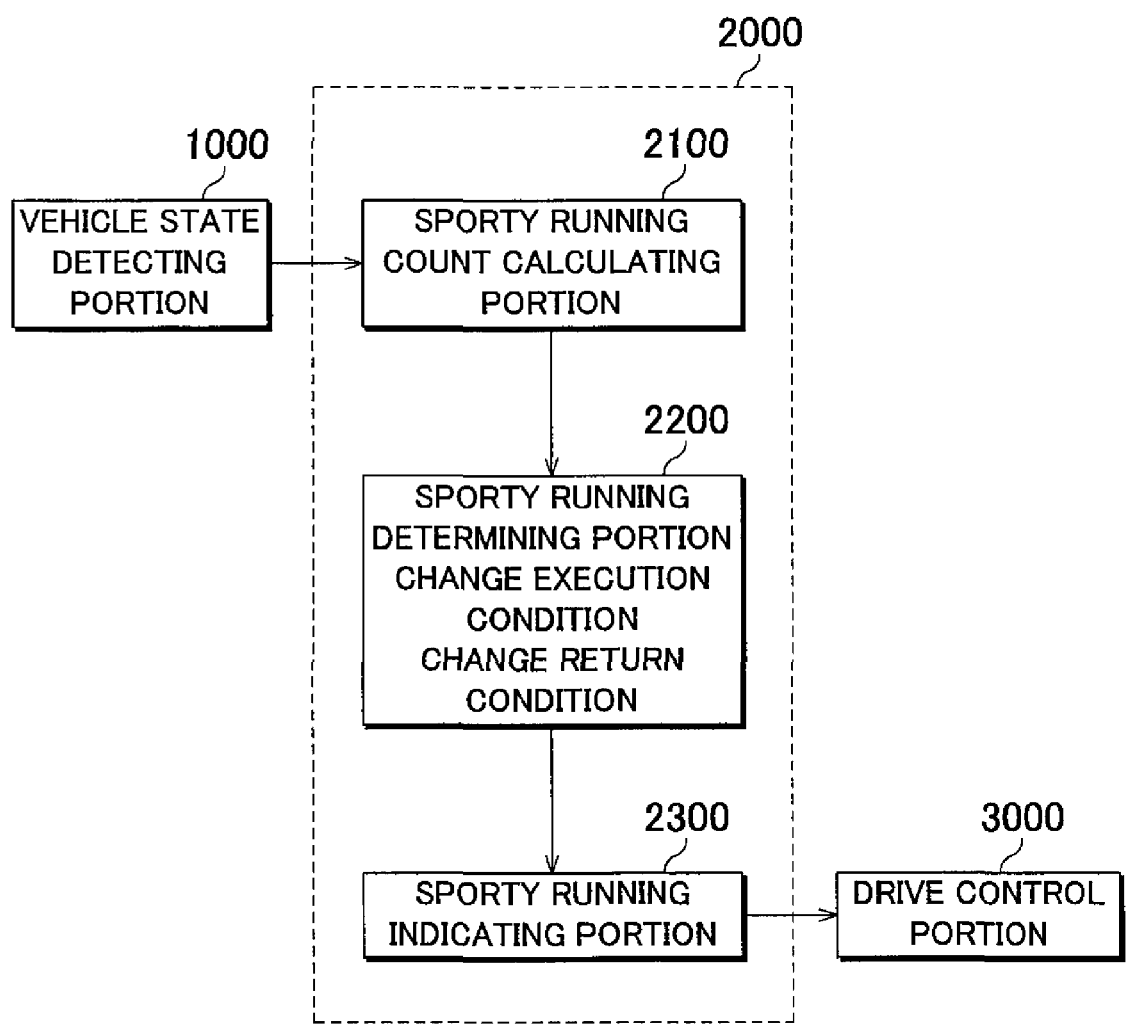
FIG. 3 is a functional block diagram of a control apparatus according to the example embodiment of the invention.

The control portion 2000 in the functional block diagram shown in FIG. 3 can be realized by hardware that mainly includes the structures of a digital circuit and an analog circuit, or can be realized by software that mainly includes a CPU and memory in the ECU 500 and a program that is read from the memory and executed by the CPU. Typically, the advantage of realizing the control portion 2000 by hardware is that the operating speed is faster, while the advantage of realizing the control portion 2000 by software is that it is easier to make design changes. Hereinafter, a case will be described in which the control apparatus is realized by software. Incidentally, the recording medium on which this kind of program is recorded is also a mode of the invention.

Figure 4:
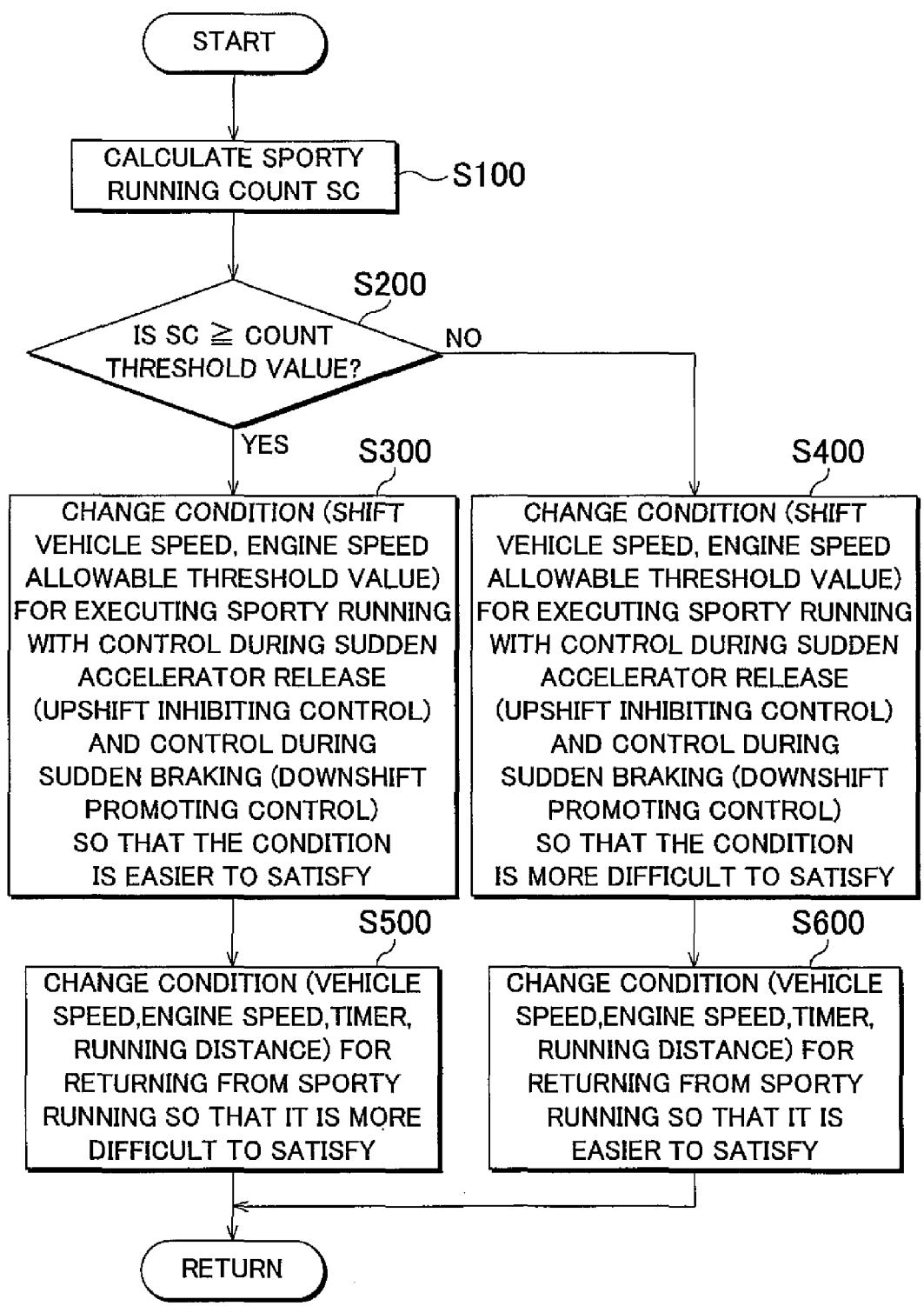
FIG. 4 is a flowchart illustrating the control structure of a program executed by the ECU.

The control structure of the program executed by the ECU 500 will now be described with reference to FIG. 4. Incidentally, this program is repeatedly executed at predetermined cycle times.

In step S100, the ECU 500 calculates the sporty running count SC. At this time, the ECU 500 calculates the sporty running count SC based on a count threshold value having hysteresis shown in FIG. 2 and at least one of the G value acting on the vehicle, the accelerator depression amount, and the brake pedal depression force that were detected. Alternatively, the ECU 500 calculates at least one of the amount of change (or the rate of change (time)) in the G value, the amount of change (or the rate of change (time)) in the accelerator depression amount, and the amount of change (or the rate of change (time)) in the brake pedal depression force, and then calculates the sporty running count SC based on these and the count threshold value having hysteresis shown in FIG. 2. Incidentally, here the sporty running count SC is counted up, i.e., calculated to be larger, as the G value, the accelerator depression amount, the brake pedal depression force, the amount of change (or the rate of change (time)) in the G value, the amount of change (or the rate of change (time)) in the accelerator depression amount, and the amount of change (or the rate of change (time)) in the brake pedal depression force increase (i.e., as the absolute values of the amounts of change and the rates of change increase). Moreover, an upper limit value may also be provided for this sporty running count SC.

In step S200, the ECU 500 determines whether the calculated sporty running count SC is equal to or greater than the count threshold value. If the calculated sporty running count SC is equal to or greater than the count threshold value (i.e., YES in step S200), the process proceeds on to step S300. If not (i.e., NO in step S200), the process proceeds on to step S400.

In step S300, the ECU 500 changes the shift vehicle speed and the engine speed allowable threshold value and the like so that the condition for executing sporty running with control when the accelerator is suddenly released (upshift inhibiting control) and/or control during sudden braking (downshift promoting control) is more easily satisfied. At this time, the ECU 500 makes it more difficult to upshift by moving the upshift line toward the higher vehicle speed side and increasing the engine speed allowable threshold value (the over-rev speed) as the upshift inhibiting control, for example. Also, the ECU 500 makes it easier to downshift by moving the downshift line toward the higher vehicle speed side and increasing the engine speed allowable threshold value (the over-rev speed) as the downshift promoting control, for example. Incidentally, the movement of the shift line and the increase in the speed may be changed discretely or continuously. Moreover, at this time, the amount that the shift line is moved and the amount that the speed is increased may be determined based on the value of the sporty running count SC. Then the process proceeds on to step S500.

In step S400, the ECU 500 changes the shift vehicle speed and the engine speed allowable threshold value and the like so that the condition for executing sporty running with control when the accelerator is suddenly released (upshift inhibiting control) and/or control during sudden braking (downshift promoting control) is more difficult to satisfy. At this time, the ECU 500 basically executes a step that is the opposite of step S300. Then the process proceeds on to step S600.

In step S500, the ECU 500 changes the vehicle speed, the engine speed, a timer, and the running distance and the like so that the condition for returning from sporty running is more difficult to satisfy. As a result, the upshift inhibiting control when the accelerator is suddenly released and the downshift promoting control during sudden braking tend to continue. At this time, the ECU 500 for example increases the vehicle speed at which sporty running is allowed, increases the engine speed at which sporty running is allowed, increases a set value of the timer that determines the period of time for which sporty running is allowed, and increases a set value of the running distance for which sporty running is allowed. Incidentally, these increases may be discrete or continuous. Furthermore, the amounts of these increases at this time may be determined based on the value of the sporty running count SC. Then this cycle of the routine ends.

In step S600, the ECU 500 changes the vehicle speed, the engine speed, the timer, and the running distance and the like so that the condition for returning from sporty running is more easily satisfied. At this time, the ECU 500 basically executes a step that is the opposite of step S500. Then this cycle of the routine ends.

Figure 5:
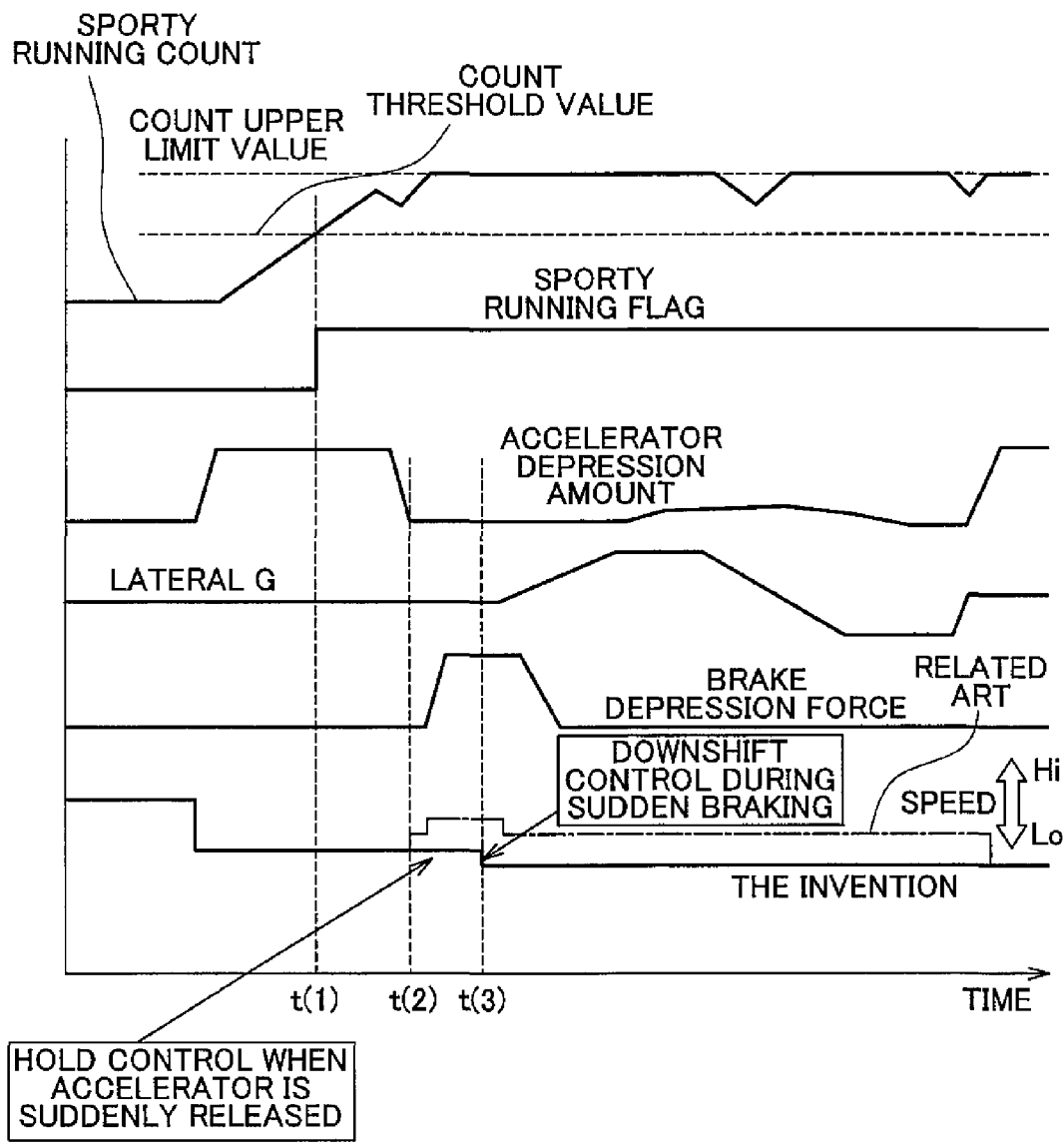
FIG. 5 is a timing chart illustrating the behavior of the vehicle when the program shown in FIG. 4 is executed.

The operation of the ECU 500 which serves as the control apparatus according to this example embodiment and is based on the foregoing structure and flowchart will hereinafter be described with reference to FIG. 5.

The sporty running count SC is calculated by being counted up or down based on accelerator and brake operations by the driver, and the acceleration acting on the vehicle while the vehicle is running (S100). If this sporty running count SC is equal to or greater than a threshold value (i.e., YES in step S200), a sporty running flag is set. This state is shown at time t(1) in FIG. 5.

If it is determined that the driver is requiring sporty running and the sporty running flag is set, the condition for executing sporty running with the control when the accelerator is suddenly released (upshift inhibiting control) and/or control during sudden braking (downshift promoting control) is changed so that it is more easily satisfied (S300).

Figure 6:
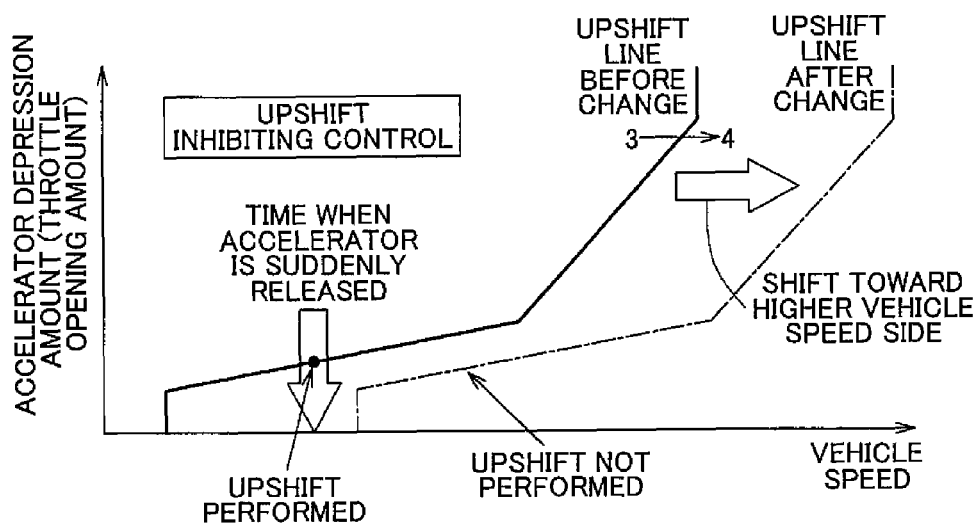
FIG. 6 is a shift map showing the changing state of an upshift line.
Figure 7:
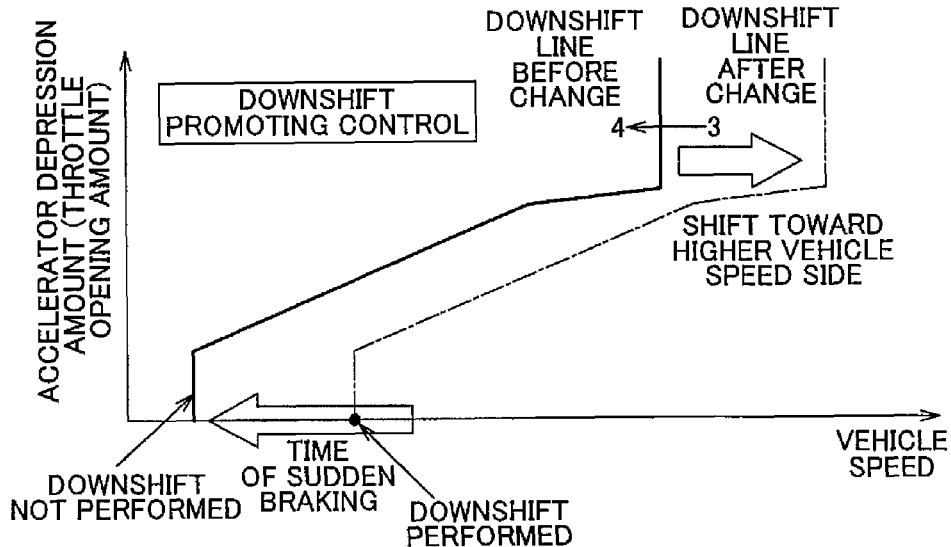
FIG. 7 is a shift map showing the changing state of a downshift line.

More specifically, (1) it is made more difficult to upshift by moving the upshift line to the higher vehicle speed side and increasing the engine speed allowable threshold value (the over-rev speed) as the upshift inhibiting control when the accelerator is suddenly released. This corresponds to the hold control when accelerator is suddenly release in FIG. 5. For example, at time t(2) when the accelerator is suddenly released, conventionally an upshift would be performed as shown by the alternate long and short dash line. However, with the control apparatus according to this example embodiment, an upshift is not performed. Instead, the current speed is maintained or held. For example, FIG. 6 shows a case in which the upshift line has been moved toward the higher vehicle speed side. As shown in FIG. 6, when the accelerator is suddenly released, the upshift line (i.e., the solid line) before the change is crossed such that an upshift ends up being performed. However, the upshift line (i.e., the alternate long and short line) after the change has moved toward the higher vehicle speed side so even if the accelerator is suddenly released, the upshift line after the change will not crossed so an upshift will not be performed. Incidentally, the upshift line may also be changed so that an upshift is prohibited and the vehicle speed that holds the current speed is increased. Also, (2) a downshift is made to occur more easily by moving the downshift line toward the higher vehicle speed side and increasing the engine speed allowable threshold value (the over-rev speed) as the downshift promoting control during sudden braking. This corresponds to the downshift control during sudden braking in FIG. 5. For example, at time t(3) during sudden beraking, conventionally a downshift would not be performed as shown by the alternate long and short dash line. However, with the control apparatus according to this example embodiment, a downshift is performed. For example, FIG. 7 shows a case in which the downshift line has been moved toward the higher vehicle speed side. As shown in FIG. 7, during sudden braking, the downshift line (i.e., the solid line) before the change is not crossed so a downshift is not performed. However, the downshift line (i.e., the alternate long and short line) after the change has moved toward the higher vehicle speed side so during sudden braking, the downshift line after the change is crossed such that a downshift is performed. Incidentally, the downshift line may also be changed so that the vehicle speed at which a downshift is performed is increased.

Moreover, with respect to returning from sporty running, if it is determined that the driver is requiring sporty running and the sporty running flag is set, a change is made that makes it more difficult to return (S500) such that the vehicle continues to be run in a sporty manner. More specifically, the vehicle speed at which sporty running is allowed is increased (i.e., sporty running is continued even at a high vehicle speed), the engine speed at which sporty running is allowed is increased (i.e., sporty running is continued even at a high engine speed), the set value of the timer that determines the period of time for which sporty running is allowed is increased (i.e., sporty running is continued even for an extended period of time), and the set value of the running distance for which sporty running is allowed is increased (i.e., sporty running is continued even for a long distance).

Meanwhile, when the vehicle is running while the sporty running flag is set, the sporty running count SC is counted down based on an accelerator or brake operation by the driver and the acceleration acting on the vehicle. If the sporty running count SC falls below a threshold value (i.e., NO in step S200), the sporty running flag is reset (i.e., the running mode switches to the normal mode).

If it is determined that the driver no longer requires sporty running and the sporty running flag is reset, the condition for executing sporty running with the control when the accelerator is suddenly released (i.e., upshift inhibiting control) and/or control during sudden braking (i.e., downshift promoting control) is made more difficult to satisfy (S400). Basically, operations opposite those in (1) and (2) above are performed.

Furthermore, the condition for returning from sporty running is changed so that it is more easily satisfied (S600). More specifically, the vehicle speed at which sporty running is allowed is reduced, the engine speed at which sporty running is allowed is reduced, the set value of the timer that determines the period of time for which sporty running is allowed is reduced, and the set value of the running distance for which sporty running is allowed is reduced.

As described above, with the control apparatus according to this example embodiment, the sporty running count, i.e., the degree to which the driver requires sporty running, is calculated based on the state of the vehicle which changed according to an operation by the driver. If it is determined based on this sporty running count that the degree to which the driver requires sporty running is high, then the shift vehicle speed and the engine speed allowable threshold value and the like are changed so that, when the accelerator is suddenly released, control which inhibits an upshift tends to be performed, and during sudden braking, control which promotes a downshift tends to be performed. When these kinds of changes are made, the vehicle runs in a sporty manner. Accordingly, behavior of the vehicle required by the driver can be realized without the driver having to operate a selector switch.

Incidentally, the automatic transmission may also be a continuously variable transmission that can realize simulated stepped automatic shifts by discretely setting a plurality of speed ratios (that is, a transmission that automatically shifts using a non-stage or stepless transmission having a so-called sequential mode). Moreover, a return count threshold value may be provided, and the running mode may switch from the sport mode to the normal mode when the sporty running count SC falls below this return count threshold value while in the sport mode.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A control apparatus of a vehicle, comprising:
   an engine;
   an automatic transmission which changes a rotational speed of the engine, wherein the vehicle having a sport mode and a normal mode as running modes;
   a detecting portion that detects a state of the vehicle according to an operation by a driver;
   a calculating portion that calculates, based on the detected state of the vehicle, a degree of quickness count with which the driver requires the vehicle to behave; and
   a control portion that controls shifting of the automatic transmission based on a shift condition while keeping the rotational speed of the engine equal to or lower than an upper limit rotational speed, wherein
   when the degree of quickness count is equal to or greater than a predetermined threshold value, the control portion switches the running mode from the normal mode to the sport mode to change the shift condition and increase the upper limit rotational speed, and maintains the changed shift condition and the increased upper limit rotational speed until a predetermined returning condition is satisfied, and
   the control apparatus further comprises changing portion that changes the returning condition based on the degree of quickness count.

2. The control apparatus according to claim 1, wherein:
   the automatic transmission is one of a stepped automatic transmission and a stepless automatic transmission that is capable of simulating a stepped automatic shift by discretely setting a plurality of speed ratios;
   the control portion performs upshift of the automatic transmission based on an upshift line that is defined by a vehicle speed and an accelerator depression amount; and
   when the degree of quickness count is equal to or greater than the predetermined threshold value, the control portion moves the upshift line toward a higher vehicle speed side and increases the upper limit rotational speed so that performance of upshift is suppressed even if the accelerator depression amount is decreased.

3. The control apparatus according to claim 1, wherein:
   the automatic transmission is one of a stepped automatic transmission and a stepless automatic transmission that is capable of simulating a stepped automatic shift by discretely setting a plurality of speed ratios;
   the control portion performs down shift of the automatic transmission based on a down shift line that is defined by a vehicle speed and an accelerator depression amount;
   when the degree of quickness count is equal to or greater than the predetermined threshold value, the control portion moves the downshift line toward a higher vehicle speed side and increases the upper limit rotational speed so that performance of downshift is promoted if the vehicle speed is decreased.

4. The control apparatus according to claim 1, wherein the upper limit rotational speed is a value that corresponds to a rotational speed at which the engine rotates excessively.

5. The control apparatus according to claim 1, wherein the calculating portion includes a portion that calculates the degree of quickness count based on at least one of the accelerator depression amount and a degree to which a brake is depressed according to the operation by the driver.

6. The control apparatus according to claim 1, wherein the calculating portion includes a portion that calculates the degree of quickness count based on acceleration acting on the vehicle as a result of the operation by the driver.

7. The control apparatus according to claim 1, wherein the control portion switches the running mode from the sport mode to the normal mode if the returning condition is satisfied when the running mode is the sport mode.

8. A control method of a vehicle that includes an engine and an automatic transmission which changes a rotational speed of the engine, the vehicle having a sport mode and a normal mode as running modes, the control method comprising:
   detecting a state of the vehicle according to an operation by a driver;
   calculating a degree of quickness count with which the driver requires the vehicle to behave based on the detected state of the vehicle; and
   controlling shifting of the automatic transmission based on a shift condition determined for shifting of the automatic transmission while the rotational speed of the engine is kept equal to or lower than an upper limit rotational speed that is set for the engine;
   wherein when the degree of quickness count is equal to or greater than a predetermined threshold value, the running mode is switched from the normal mode to the sport mode to change the shift condition and increase the upper limit rotational speed, and the changed shift and the increased upper limit rotational speed are maintained until a predetermined returning condition is satisfied, and
   wherein the control method further comprises changing returning condition based on the degree of quickness count.

9. The control method according to claim 8, wherein:
   the automatic transmission is one of a stepped automatic transmission and a stepless automatic transmission that is capable of simulating a stepped automatic shift by discretely setting a plurality of speed ratios;

upshift of the automatic transmission is controlled based on an upshift line that is defined by a vehicle speed and an accelerator depression amount; and when the degree of quickness count is equal to or greater than the predetermined threshold value, the upshift line is moved toward a higher vehicle speed side and the upper limit rotational speed is increased so that performance of upshift is suppressed even if the accelerator depression amount is decreased.

10. The control method according to claim 8, wherein:

the automatic transmission is one of a stepped automatic transmission and a stepless automatic transmission that is capable of simulating a stepped automatic shift by discretely setting a plurality of speed ratios;

when controlling the shifting, downshift of the automatic transmission is performed based on a downshift line that is defined by a vehicle speed and an accelerator depression amount; and when the degree of quickness count is equal to or greater than the predetermined threshold value, the downshift line is moved toward a higher vehicle speed side and the upper limit rotational speed is increased so that performance of downshift is promoted if the vehicle speed is decreased.

11. The control method according to claim 9, wherein the upper limit rotational speed is a value that corresponds to a rotational speed at which the engine rotates excessively.

12. The control method according to claim 8, wherein the degree of quickness count is calculated based on at least one of the accelerator depression amount and a degree to which a brake is depressed according to the operation by the driver.

13. The control method according to claim 8, wherein the degree of quickness count is calculated based on acceleration acting on the vehicle as a result of the operation by the driver.

14. The control method according to claim 8, wherein when controlling the shifting, the running mode is switched from the sport mode to the normal mode if the returning condition is satisfied when the running mode is the sport mode.

15. A non-transitory computer readable recording medium on which is recorded a program that commands a computer to realize the control method according to claim 8.

* * * * *